US010669921B2

United States Patent
Mietschnig

(10) Patent No.: US 10,669,921 B2
(45) Date of Patent: Jun. 2, 2020

(54) THERMOSTAT VALVE

(71) Applicant: Bayerische Motoren Werke Aktiengesellschaft, Munich (DE)

(72) Inventor: Werner Mietschnig, Doelsach (AT)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 84 days.

(21) Appl. No.: 15/472,447

(22) Filed: Mar. 29, 2017

(65) Prior Publication Data

US 2017/0198626 A1   Jul. 13, 2017

Related U.S. Application Data

(63) Continuation of application No. PCT/EP2015/072807, filed on Oct. 2, 2015.

(30) Foreign Application Priority Data

Nov. 3, 2014   (DE) .......................... 10 2014 222 368

(51) Int. Cl.
*F01P 7/16* (2006.01)
*F16K 31/00* (2006.01)
(Continued)

(52) U.S. Cl.
CPC ............. *F01P 7/16* (2013.01); *F16K 31/002* (2013.01); *G05D 23/022* (2013.01); *G05D 23/1333* (2013.01)

(58) Field of Classification Search
CPC ........ F16K 31/002; F01P 7/16; G05D 23/022; G05D 23/024; G05D 23/08
See application file for complete search history.

(56) References Cited

U.S. PATENT DOCUMENTS 3,510,060 A * 5/1970 Starmuhler ............... F01P 7/16
                                             236/34.5
3,817,450 A   6/1974 Mischke
(Continued)

FOREIGN PATENT DOCUMENTS

CN        103201476 A      7/2013
CN        103899407 A      7/2014
(Continued)

OTHER PUBLICATIONS

Chinese-language Office Action issued in counterpart Chinese Application No. 201580043968.5 dated May 31, 2018 with English translation (fourteen (14) pages).
(Continued)

*Primary Examiner* — Edward F Landrum
*Assistant Examiner* — Alexis K Cox
(74) *Attorney, Agent, or Firm* — Crowell & Moring LLP

(57) ABSTRACT

A thermostat valve includes a thermostat housing having engine-side and radiator-side coolant inlets that are opposed each other, a lateral coolant outlet leading to an internal combustion engine, and a valve disk. The valve disk has an end face that interacts with and faces a valve seat of the radiator-side coolant inlet. The valve disk lies between the radiator-side coolant inlet and a thermostat element arranged in the thermostat housing. The valve disk has, at the outer edge, a guiding element that includes a deflecting surface on the exterior side of the guiding element.

18 Claims, 4 Drawing Sheets

(51) Int. Cl.
*G05D 23/02* (2006.01)
*G05D 23/13* (2006.01)

(56) References Cited

U.S. PATENT DOCUMENTS

| | | | | |
|---|---|---|---|---|
| 3,974,844 | A * | 8/1976 | Pimentel | F03G 7/065 |
| | | | | 137/1 |
| 4,288,031 | A | 9/1981 | Hass | |
| 5,419,488 | A | 5/1995 | Saur et al. | |
| 5,979,778 | A | 11/1999 | Saur | |
| 2005/0268866 | A1* | 12/2005 | Finkbeiner | F01P 7/16 |
| | | | | 123/41.1 |
| 2006/0163373 | A1 | 7/2006 | Inoue | |
| 2009/0140055 | A1 | 6/2009 | Iwasaki | |
| 2009/0183696 | A1* | 7/2009 | O'Flynn | F01P 7/16 |
| | | | | 123/41.1 |
| 2013/0180477 | A1 | 7/2013 | Nakajima et al. | |
| 2014/0182522 | A1 | 7/2014 | Lee et al. | |
| 2017/0285669 | A1* | 10/2017 | Ruoff | F01P 7/16 |

FOREIGN PATENT DOCUMENTS

| | | |
|---|---|---|
| DE | 43 25 975 A1 | 2/1995 |
| DE | 195 45 081 A1 | 6/1997 |
| DE | 197 25 222 A1 | 12/1998 |
| DE | 10 2013 215 749 A1 | 2/2015 |
| DE | 10 2013 224 182 A1 | 5/2015 |

OTHER PUBLICATIONS

International Search Report (PCT/ISA/210) issued in PCT Application No. PCT/EP2015/072807 dated Feb. 8, 2016 with English translation (five pages).
German-language Written Opinion (PCT/ISA/237) issued in PCT Application No. PCT/EP2015/072807 dated Feb. 8, 2016 (six pages).
German Search Report issued in counterpart German Application No. 10 2014 222 368.7 dated Jul. 3, 2015 with partial English translation (13 pages).
Chinese-language Office Action issued in counterpart Chinese Application No. 201580043968.5 dated Dec. 13, 2018 with English translation (10 pages).

* cited by examiner

Fig. 1
(Prior Art)
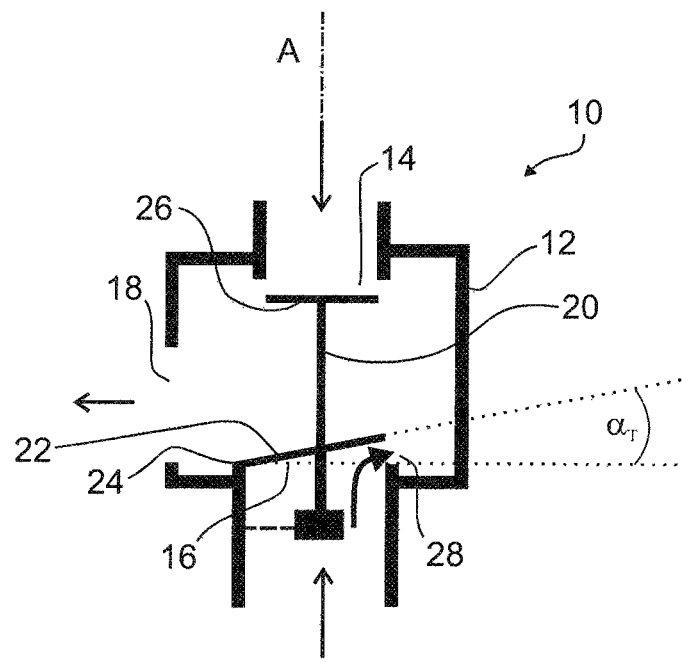
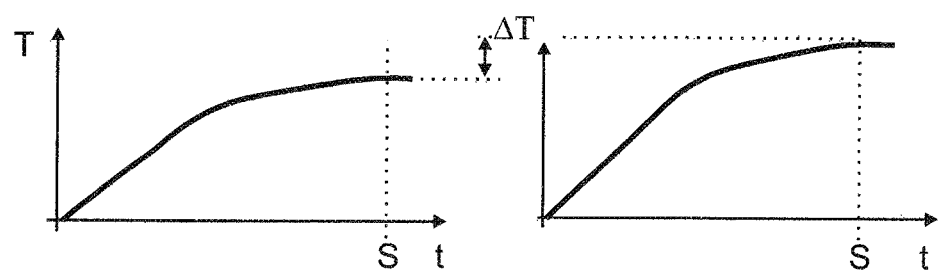
Fig. 2A
(Prior Art)
Fig. 2B
(Prior Art)

THERMOSTAT VALVE

CROSS REFERENCE TO RELATED APPLICATIONS

This application is a continuation of PCT International Application No. PCT/EP2015/072807, filed Oct. 2, 2015, which claims priority under 35 U.S.C. § 119 from German Patent Application No. 10 2014 222 368.7, filed Nov. 3, 2014, the entire disclosures of which are herein expressly incorporated by reference.

BACKGROUND AND SUMMARY OF THE INVENTION

The invention relates to a thermostat valve for a cooling system of an internal-combustion engine.

Thermostat valves are used for controlling the coolant temperature in the cooling circuit of an internal-combustion engine. In conventional cooling circuits, there is a so-called small cooling circuit, where the coolant is guided through the engine but not through the radiator of a vehicle, and a large cooling circuit, where the flow takes place through the engine as well as through the radiator, in which case, the coolant releases the heat absorbed from the engine back into the radiator. In order to open and close the flow connections between the sections of the cooling circuit, the thermostat valve has a temperature-sensitive thermostat element that lifts and lowers a valve disk, which opens or closes a radiator-side coolant inlet.

FIG. 1 illustrates a conventional thermostat valve 10 having a thermostat housing 12, in which an engine-side coolant inlet 14 and a radiator-side coolant inlet 16 are provided, which are disposed opposite one another. In addition, a laterally arranged coolant outlet 18 leading to the engine is provided in the thermostat housing 12. A thermostat element 20, which defines a longitudinal axis A, is oriented in an essentially centered fashion with respect to the coolant inlets 14, 16 in the thermostat housing 12. A valve disk 22 is fixedly connected with the thermostat element 20 and can close and open the radiator-side coolant inlet 16, in that it rests on a valve seat 24 or is released from the latter. In addition, a second valve disk 26 is fixedly connected with the thermostat element 20, which can open or close the engine-side coolant inlet 14.

At low coolant temperatures, the radiator-side coolant inlet 16 will be closed, while the engine-side coolant inlet 14 is open, so that the flow takes place only through the small coolant circuit. When the thermostat element 20 expands as the temperature rises, the two valve disks 22, 26 will be displaced in the upward direction in the FIG. 1. With a rising temperature, the engine-side coolant inlet 14 will therefore be closed, while the radiator-side coolant inlet 16 is opened in order to switch from the small coolant circuit to the large cooling circuit.

Due to component tolerances of the valve disk 22 and/or of the valve seat 24, there often is a slight undesired tilting of the valve disk 22 or of the valve seat 24. In a borderline case, this may have the result that, in a first stroke range of the valve disk 22, during the opening of the radiator-side coolant inlet 16, a gap 28 is already created in an unintended manner between the valve disk 22 and the valve seat 24, through which cold coolant from the radiator flows into the thermostat valve 10 and flows around the thermostat element 20 before it flows off through the engine-side outlet of the thermostat valve 10. In this borderline case illustrated in FIG. 1, as a result of the component tolerances, the valve disk 22 has a maximal tilt of an angle $\alpha_T$ with respect to a plane perpendicular to the longitudinal axis A, the valve disk 22 being oriented in the thermostat housing 12 such that the angle $\alpha_T$ and therefore the resulting gap 28 between the valve disk 22 and its valve seat 24 is opened toward the wall of the thermostat housing 12 and away from the coolant outlet 18.

In this case, the temperature reaction of the thermostat valve 10 is falsified because the coolant flowing back from the engine, which essentially is to define the control temperature, is displaced or mixed with cold coolant. Based on the resulting cold coolant flow around the thermostat element 20, the switching temperature of the thermostat valve 10 shifts upward by the amount $\Delta T$ (see FIG. 2b). The coolant temperature at the thermostat element 20 is therefore lower than the temperature of the coolant flowing back from the engine, so that the actual switching point at the thermostat valve 10 may be at an undesirably high temperature.

For the purpose of comparison, the temperature difference is illustrated in FIGS. 2a and 2b. FIG. 2a shows a characteristic temperature-time line to switching point S of the thermostat valve 10 for an ideally oriented valve disk 22 ($\alpha_T=0$). In contrast, FIG. 2b illustrates the situation shown in FIG. 1, in which the maximal component tolerance, thus a maximally large angle $\alpha_T$ as well as a tilt of the valve disk 22 in the direction of the wall of the thermostat housing 12 are combined. The deviation $\Delta T$ may amount to up to 5° C.

It is therefore an object of the invention to reduce variation between the inlet temperature of the coolant into the engine and the switching temperature of the thermostat valve.

According to the invention, a thermostat valve for a cooling system of an internal-combustion engine includes a thermostat housing having an engine-side and a radiator-side coolant inlet, which are disposed opposite one another. The thermostat valve further includes a lateral coolant outlet leading to the internal-combustion engine, and a valve disk, which has an end face, which interacts with a valve seat of the radiator-side coolant inlet and is disposed opposite the valve seat. The valve disk is disposed between the radiator-side coolant inlet and a thermostat element arranged in the thermostat housing. A switching direction of the valve disk defines a longitudinal axis. The valve disk has a disk part and a guiding element connected with the latter at the outer edge of the disk part. The guiding element has a deflecting surface on the exterior side, which prevents the thermostat element from a direct or too excessive cold flow towards the thermostat element. A greater mixing of the radiator-side, relatively cold coolant with engine-side, relatively warm coolant can thereby be achieved before the mixed coolant contacts with the thermostat element, which can minimize a contact of unmixed cold coolant with the thermostat element and thus minimize undesirable variation of the switching temperature of the thermostat valve.

The deflecting surface may extend away from the end face to the engine-side coolant inlet and, in addition, away from the longitudinal axis, whereby the coolant flowing in out of the radiator-side coolant inlet is guided laterally away from the longitudinal axis of the thermostat element. According to a preferred embodiment, the guiding element is designed as a closed circumferential collar. The collar may be a funnel which widens to form a free edge. As a result, regardless of the actual angular position of the tolerance, which causes tilt of the valve seat and/or of the valve disk, cold coolant can be guided away from the thermostat element. However, in an alternative embodiment, the collar may be provided only in sections on the circumference of the valve disk and thereby exercise a shielding effect.

In another aspect of the invention, optionally an acceleration of the flow of the relatively cold coolant out of the radiator-side coolant outlet can be achieved with respect to the relatively warm coolant out of the engine-side coolant outlet, in order to ensure a good mixing, before the mixed water can flow to the thermostat element.

The guiding element may, in addition, have a cross-section which widens in the direction of the engine-side coolant inlet, whereby a mixing of coolant from both coolant inlets is further promoted.

Preferably, an exterior lateral surface of the guiding element is constructed as at least one part of the deflecting surface. In an embodiment, the disk part and/or the guiding element can also be connected with one another in one piece.

According to a further embodiment, the deflecting surface adjoins the outer edge of the disk part and, in an area spaced away from the disk part in the direction of the longitudinal axis, has a diameter which amounts to more than 110%, preferably at least 125%, of the outside diameter of the disk part. This ensures the lateral deflection of the coolant.

In an embodiment, the thermostat element extends from the disk part essentially in the direction of the longitudinal axis to the engine-side coolant inlet.

According to a further embodiment, an angular tolerance of the valve seat and/or of the assigned end face is provided at the valve disk relative to a plane perpendicular to the longitudinal axis. At any angle within the angular tolerance, preferably also in any rotational position of the angle about the longitudinal axis, a radially outermost point of the deflecting surface is farther away from the longitudinal axis than a radially inside radius of the valve seat. As a result, it is ensured that the radiator-side coolant, before it contacts with the thermostat element, is first laterally deflected therefrom. As a result of the flow conditions in the thermostat housing, a greater mixing of coolant from the two inlets can therefore be ensured, particularly when the angular tolerance is designed such that the radiator-side coolant first flows into the valve on the side facing away from the coolant outlet.

This advantage can also be achieved or increased in that, in addition or as an alternative, the deflecting surface is rotationally symmetrical with respect to a center axis extending perpendicularly to the end face and expands from the disk part to a radially outermost point of the deflecting surface on average by an angle with respect to the center axis, which preferably is by multiple times greater than the angular tolerance, in which case, in a radially sectional view, the deflecting surface has a straight, stepped and/or curved shape.

According to a preferred further embodiment, the valve disk extends in the direction of the longitudinal axis along at least a quarter, preferably at least a third or at least half of the distance between the engine-side and the radiator-side coolant inlet, whereby the guiding of the radiator coolant to the engine coolant flow is improved.

It may further be provided that, at least in a circumferential area facing away from the coolant outlet, the valve disk has an outside diameter that corresponds essentially to an inside diameter of the thermostat housing, whereby the valve disk rests almost on the interior side of the thermostat housing, whereby, at least in this circumferential area, the radiator-side coolant is maximally laterally guided away from the thermostat element.

Preferably, the disk part, the guiding element and/or the valve disk consist of an identical material and, in particular, are connected with one another in one piece and/or are produced as a workpiece, which may be advantageous in view of the manufacturing and the mounting of these parts.

The thermostat valve is preferably designed in a known manner such that it can allow or prevent a coolant flow through the radiator-side coolant inlet of the internal-combustion engine, and also such that it can allow or prevent a coolant flow through the engine-side coolant inlet. According to a known construction, a second valve disk may be provided in the thermostat valve, which is also fixedly connected with the thermostat element, and which can close and open the engine-side coolant inlet, in order to control the switching of the large and the small coolant circuit.

The thermostat element may be arranged in a conventional manner on the longitudinal axis. In this case, the valve disk is preferably fixedly connected with the thermostat element. In this manner, the tolerance compensation has the greatest possible effect.

According to the invention, several of the above-described further developments of the invention can also—if technically conceivable—be combined with one another.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 1 is a schematic sectional view of a thermostat valve according to prior art;

FIGS. 2A and 2B are views of characteristic temperature-time lines of the thermostat valve known from prior art;

DETAILED DESCRIPTION OF THE DRAWINGS

Figure 3:
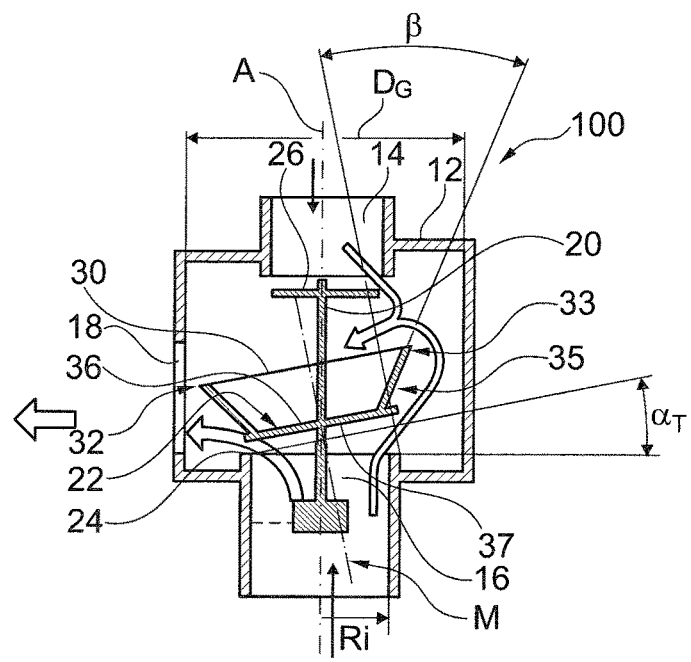
FIG. 3 is a view of a thermostat valve according to a first embodiment of the invention when the valve disk is in one of the two tolerance limit positions.

In the following, the components which are identical with or have the same functions as those of the thermostat valve 10 of FIG. 1, will retain their already introduced reference numerals or symbols.

FIG. 3 illustrates a thermostat valve 100 according to a first embodiment of the invention.

As in the case of the elongated thermostat valve 10 illustrated in FIG. 1, a thermostat element 20, which defines a longitudinal axis A, is essentially oriented in a centered manner with respect to mutually opposite engine-side and radiator-side coolant inlets 14 and 16 respectively in the thermostat housing 12. A fist valve disk 22 is fixedly connected with the thermostat element 20.

The stroke of the thermostat element 20 takes place along the longitudinal axis A, which therefore also defines the switching direction of the thermostat valve 100. The first valve disk 22 can close and open the radiator-side coolant inlet 16 at a valve seat 24. In addition, a second valve disk 26 is fixedly connected with the thermostat element 20. The second valve disk 26 can open or close the engine-side coolant inlet 14.

The first valve disk 22 includes a disk part 36 and a guiding element 30 which are mutually connected in one piece and are made of an aluminum or steel material resistant to influences of the coolant.

The disk part 36 has an end face 37, which faces the valve seat 24.

In a not-limiting embodiment of the present invention, the guiding element 30 is a collar, which starts out from the disk part 36, specifically from its radially circumferential edge and expands in a funnel-shaped manner. This collar extends rotationally symmetrically with respect to a center axis M, which extends perpendicularly with respect to the end face 37. The angle β, by which the guiding element 30 expands, may range, for example, between 10° and 60°. However, the angle β is not limited to this range. In other embodiment, the angle β may be 0° for example.

The axial height of the first valve disk 22 may amount to at least a quarter of the distance between the valve seat 24 and the corresponding valve seat of the engine-side coolant inlet 14.

By means of the angle $\alpha_T$, FIG. 3 illustrates the maximal angular tolerance of the valve seat 24 with respect to the end face 37. Parts, which are above this angular tolerance, are considered as rejected. However, for the purpose of simplification, the amount of the angular tolerance is significantly exaggerated in the drawings even though in reality, it only amounts to a few degrees. In the present exemplary embodiment, the first valve disk 22 and the end face 37 are disposed diagonally with respect to the axis A; i.e. the center axis is situated at an angle with respect to the axis A and does not coincide with the latter. As a result, if the end face 37 rests on the valve seat 24 at the left edge, a gap will occur at the right edge between this section of the valve seat 24 and the opposite section of the end face 37. By way of this gap, outflowing coolant can flow into the interior of the thermostat housing 12. By means of the deflecting surface 35, the inflowing cold coolant is pushed to the outside and, close to the wall of the thermostat housing 12, will encounter the warmer coolant from the engine. The two coolant flows are thereby mixed before they flow in the direction of the coolant outlet 18, and before they impinge upon the thermostat element 20.

The angle β is selected such that, in the area of the gap between the valve seat 24 and the end face 37, relative to the closing position of the first valve disk 22, a radially outermost point 33 is formed on the deflecting surface 35. Starting from the disk part 36, the deflecting surface widens toward this point 33, in which case, the angle β is larger, preferably larger by a multiple, than the angular tolerance $\alpha_T$. In other words, even in a maximal tilt of the disk part 36, the deflecting surface 35 still has an effect in the area of the gap in order to guide the cold coolant flow laterally to the outside.

In a radial sectional view, the deflecting surface 35 has a straight, stepped and/or curved shape.

During the operation at low coolant temperatures, the radiator-side coolant inlet 16 is at least largely closed by the valve disk 22, but the above-mentioned gap is still conceivable because of the production-related angular tolerance $\alpha_T$. The engine-side coolant inlet 14 is opened, so that the flow only takes place through a small cooling circuit. As the coolant becomes warmer, the thermostat element 20 will expand increasingly, so that the valve disks 22, 26 are placed farther away from each other, and the second valve disk 26 is moved in the direction of its valve seat, in order to finally close the coolant inlet 14, whereas the radiator-side coolant inlet 16 is opened in order to switch from the small cooling circuit to the large cooling circuit.

The radially outermost point 33 is therefore spaced farther away from the longitudinal axis A than an inside radius $R_I$ of the valve seat 24.

As a result, essentially the entire coolant arriving at the thermostat element 20 will have a higher temperature than the radiator-side coolant had originally. The deformation behavior of the thermostat valve 20 and thereby the switching point S of the thermostat valve 100 is therefore not or only negligibly influenced in an unfavorable manner.

Figures 4A, 4B:
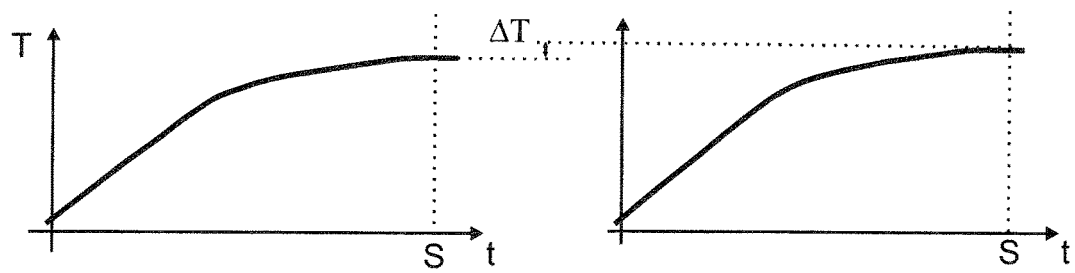
FIGS. 4A and 4B are views of characteristic temperature-time lines for the two tolerance limit positions of the thermostat valve from FIG. 3.

FIG. 4a shows a characteristic temperature-time line for the first tolerance limit case, where the gap between the first valve disk 22 and the valve seat 24 opens toward the coolant outlet 18 with the maximal gap width determined by the angular tolerance ΔT.

FIG. 4b shows a characteristic temperature-time line for the second tolerance limit case, where the gap opens toward the side opposite the coolant outlet 18 with the maximal gap width. Since, as a result of the implementation of the deflecting surface 35 and of the guiding element 30, the coolant coming from the radiator is first guided away laterally from the thermostat element 20, so that it mixes with the warmer coolant coming from the engine, there is only a slight temperature reduction at the thermostat element 20 as a result of the outflowing coolant flowing to the coolant outlet 18. Therefore, only a clearly lower temperature difference ΔT in the switching temperature compared to the case illustrated in FIGS. 2a and 2b without a guiding element 30 or deflecting surface 35.

Figure 5:
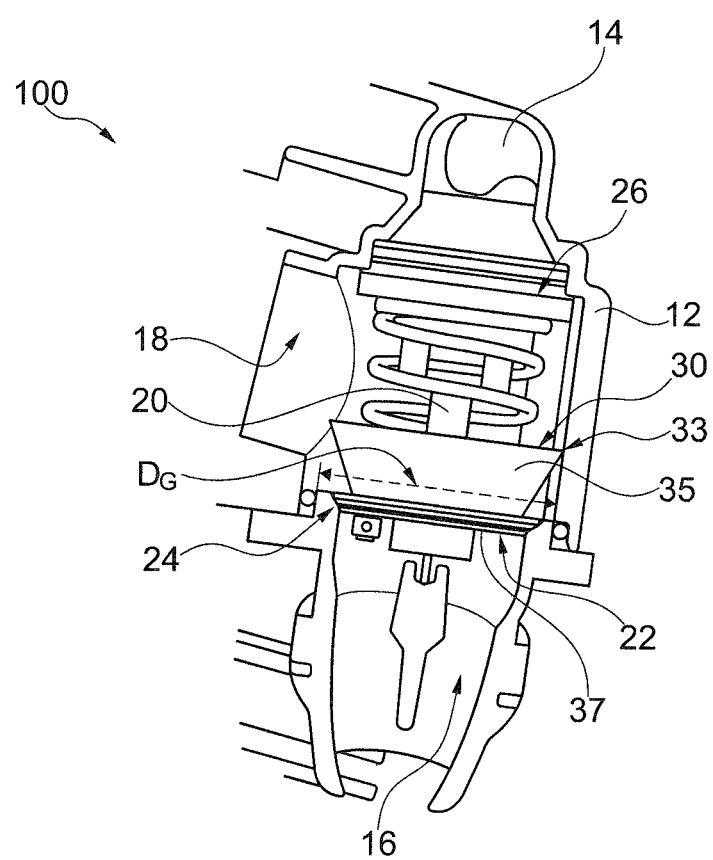
FIG. 5 is a perspective view of a thermostat valve according to a second embodiment of the invention.

FIG. 5 shows a second embodiment, in which the guiding element 30 with its deflecting surface 35 is constructed in one piece with the radiator-side valve disk 22, and the radially outermost point 33 of the radial cross-section of the guiding element 30 facing away from the coolant outlet 18, in the area of the gap, in the closed position, is situated essentially on a diameter, which corresponds essentially to the inside diameter $D_G$ of the thermostat housing 12, so that the deflecting surface 35 almost contacts the interior side of the thermostat housing 12.

In this example, the thermostat housing 12 is integrated in a water pump housing, which is shown in FIG. 5 only in the areas adjacent to the thermostat valve 100.

Figure 6:
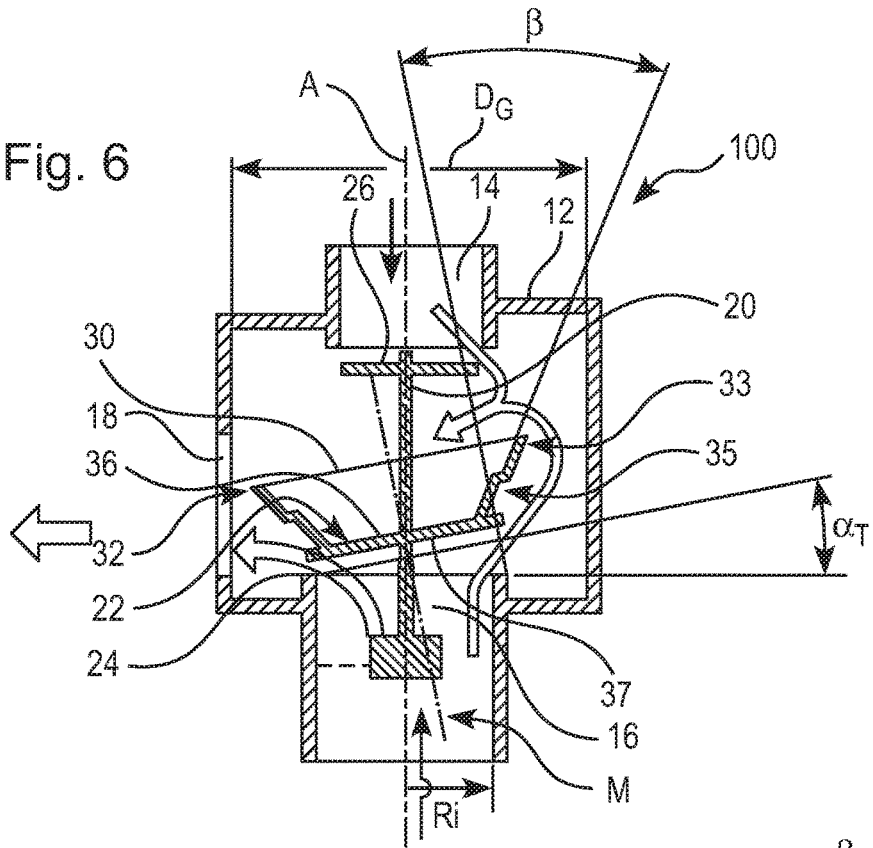
FIG. 6 is a view of a thermostat valve according to another embodiment of the invention.
Figure 7:
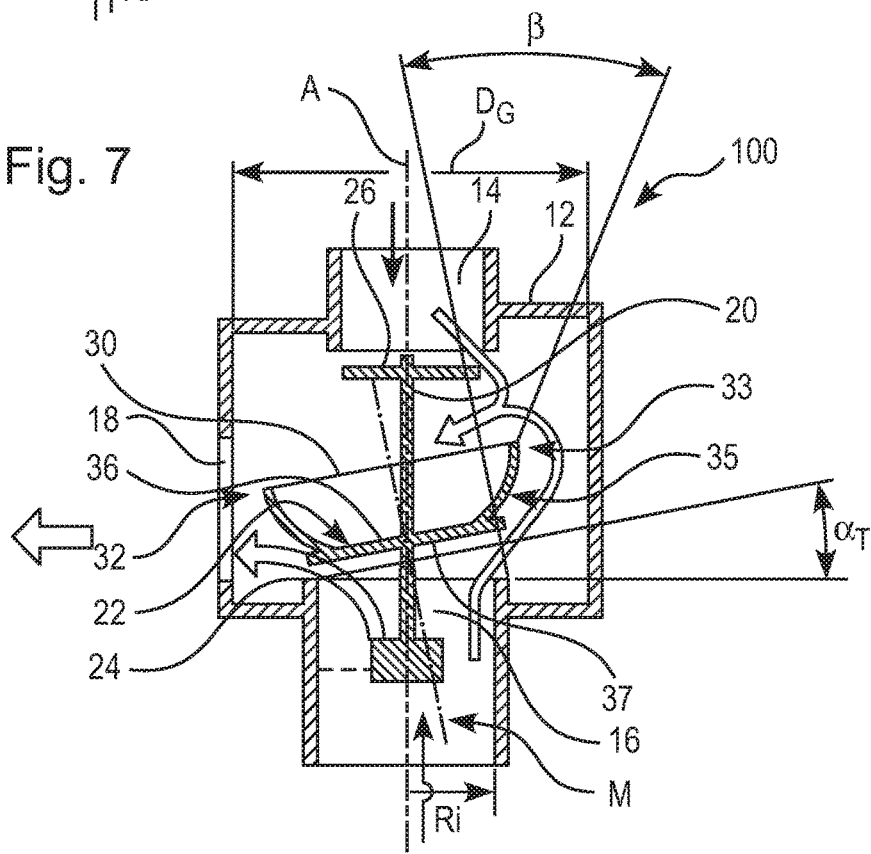
FIG. 7 is a view of a thermostat valve according to another embodiment of the invention.

FIG. 6 depicts a thermostat valve according to another embodiment of the invention, in which the deflecting surface has a profile of a stepped shape, FIG. 7 depicts a thermostat valve according to another embodiment of the invention in which the deflecting surface has a profile of a curved shape.

What is claimed is:

1. A thermostat valve for a cooling system of an internal-combustion engine, comprising:
   a thermostat housing having an engine-side coolant inlet and a radiator-side coolant inlet;
   a lateral coolant outlet leading to the internal-combustion engine; and
   a valve disk having an end face that interacts with a valve seat of the radiator-side coolant inlet and faces the valve seat, the valve disk being disposed between the radiator-side coolant inlet and a thermostat element arranged in the thermostat housing, a direction of movement of the valve disk defining a longitudinal axis, wherein
   the valve disk includes a disk part and a guiding element connected with the disk part at an outer edge of the disk part, the guiding element has a deflecting surface on an exterior side, and the guiding element is disposed on the opposite side of the disk part from the end face, with a base of the guiding element being slightly inset from an outermost edge of the disk part.

2. The thermostat valve according to claim 1, wherein the guiding element is configured as a closed, circumferential, and rotationally symmetrical collar.

3. The thermostat valve according to claim 2, wherein the collar is configured to be a funnel that widens to form a free edge.

4. The thermostat valve according to claim 1, wherein the deflecting surface extends away from the end face to the engine-side coolant inlet and extends away from the longitudinal axis, and guides coolant flowing in out of the radiator-side coolant inlet laterally away from the longitudinal axis of the thermostat element.

5. The thermostat valve according to claim 1, wherein the guiding element has a cross-section that expands in the direction of the engine-side coolant inlet.

6. The thermostat valve according to claim 1, wherein the deflecting surface adjoins the outer edge of the disk part and has a portion whose outer diameter is greater than 110% of an outer diameter of the disk part.

7. The thermostat valve according to claim 4, wherein the deflecting surface adjoins the outer edge of the disk part and has a portion whose outer diameter is greater than 110% of an outer diameter of the disk part.

8. The thermostat valve according to claim 7, wherein the outer diameter of the portion of the deflecting surface is at least 125% of the outer diameter of the disk part.

9. The thermostat valve according to claim 1, wherein the thermostat element extends from the disk part to the engine-side coolant inlet.

10. The thermostat valve according to claim 1, wherein the valve disk has an angular tolerance with either the valve seat or the end face, and a radially outermost point of the deflecting surface, when the valve disk is in a closed position and within the angular tolerance, is disposed farther from the longitudinal avis than an inner radius of the valve seat.

11. The thermostat valve according to claim 1, wherein the valve disk has an angular tolerance with either the valve seat or the end face, and the deflecting surface is rotationally symmetrical with respect to a center axis extending perpendicularly to the end face.

12. The thermostat valve according to claim 11, wherein the gap between the valve seat and the end face in the closed position of the valve disk forms an angle equal to the angular tolerance.

13. The thermostat valve according to claim 11, wherein the deflecting surface has a profile of a stepped or curved shape.

14. The thermostat valve according to claim 1, wherein a length of the valve disk corresponds to at least a quarter of a distance between the engine-side coolant inlet and the radiator-side coolant inlet.

15. The thermostat valve according to claim 1, wherein a length of the valve disk corresponds to at least half of a distance between the engine-side coolant inlet and the radiator-side coolant inlet.

16. The thermostat valve according to claim 1, further comprising:

a second valve disk connected with the thermostat element, wherein the second valve disk is configured to close or open the engine-side coolant inlet.

17. The thermostat according to claim 1, wherein the thermostat element is arranged on the longitudinal axis and the valve disk is fixedly connected with the thermostat element.

18. The thermostat according to claim 16, wherein the thermostat element is arranged on the longitudinal axis and the second valve disk is fixedly connected with the thermostat element.

* * * * *